United States Patent
Itou (10) Patent No.: US 8,891,210 B2
(45) Date of Patent: Nov. 18, 2014

(54) ELECTRONIC CONTROL UNIT INCLUDING DISCHARGING CIRCUIT WITH PLURALITY OF RESISTORS CONNECTED IN SERIES

(75) Inventor: Akito Itou, Kariya (JP)

(73) Assignee: Denso Corporation, Kariya (JP)

( * ) Notice: Subject to any disclaimer, the term of this patent is extended or adjusted under 35 U.S.C. 154(b) by 438 days.

(21) Appl. No.: 13/281,695

(22) Filed: Oct. 26, 2011

(65) Prior Publication Data

US 2012/0098470 A1 Apr. 26, 2012

(30) Foreign Application Priority Data

Oct. 26, 2010 (JP) .................................. 2010-239890

(51) Int. Cl.
| | |
|---|---|
| H02H 7/08 | (2006.01) |
| H02J 7/00 | (2006.01) |
| H02P 27/02 | (2006.01) |
| H02P 27/06 | (2006.01) |
| H02P 29/02 | (2006.01) |

(52) U.S. Cl.
CPC ............. *H02P 29/021* (2013.01); *H02P 27/06* (2013.01)
USPC ............................. 361/23; 320/132; 318/138

(58) Field of Classification Search
CPC ........ Y02T 10/7044; H02H 3/20; H02H 7/08; H02H 7/09; H02H 7/093; H02M 3/335; H02P 29/021
USPC ...................... 318/139, 138; 361/23; 340/648; 320/DIG. 32, 132, 134
See application file for complete search history.

(56) References Cited

U.S. PATENT DOCUMENTS

| | | | | |
|---|---|---|---|---|
| 4,169,990 | A * | 10/1979 | Lerdman ................... | 318/400.41 |
| 5,804,973 | A * | 9/1998 | Shinohara et al. ............ | 324/548 |
| 6,002,221 | A * | 12/1999 | Ochiai et al. ................... | 318/139 |
| 6,642,679 | B2 * | 11/2003 | Nagatake et al. ............. | 318/139 |
| 2003/0151934 | A1 | 8/2003 | Kitamura | |
| 2007/0114973 | A1 * | 5/2007 | Miyamoto ..................... | 320/132 |

FOREIGN PATENT DOCUMENTS

| | | |
|---|---|---|
| JP | 10-257778 | 9/1998 |
| JP | 3289567 | 3/2002 |
| JP | 2003-240810 | 8/2003 |
| JP | 2005-233822 | 9/2005 |
| JP | 2005-304138 | 10/2005 |
| JP | 2007-006615 | 1/2007 |
| JP | 2008-172862 | 7/2008 |
| JP | 2008-184904 | 8/2008 |
| JP | 2010-193663 | 9/2010 |

OTHER PUBLICATIONS

Office Action (2 pages) dated Jul. 9, 2013, issued in corresponding Japanese Application No. 2010-239890 and English translation (2 pages).

* cited by examiner

*Primary Examiner* — Eduardo Colon Santana
*Assistant Examiner* — Zemenay Truneh
(74) *Attorney, Agent, or Firm* — Nixon & Vanderhye PC (57) ABSTRACT

An electronic control unit mounted on a vehicle includes: a capacitor that smoothes voltage of a DC power source electrically isolated from a body of the vehicle; a resistor circuit including a plurality of resistors connected in series, which is connected in parallel to the capacitor to discharge electric charge stored in the capacitor; and a fault judging circuit that judges whether or not the resistor circuit is in a fault condition by comparing the voltage across the resistor included in the resistor circuit with a fault threshold value. The fault judging circuit is adapted to change the fault threshold value based on the voltage of the DC power source.

8 Claims, 4 Drawing Sheets

ELECTRONIC CONTROL UNIT INCLUDING DISCHARGING CIRCUIT WITH PLURALITY OF RESISTORS CONNECTED IN SERIES

CROSS REFERENCE TO RELATED APPLICATION

This application is based on and claims the benefit of priority from earlier Japanese Patent Application No. 2010-239890 filed Oct. 26, 2010, the description of which is incorporated herein by reference.

BACKGROUND

1. Technical Field

The present invention relates to an electronic control unit, and more particularly to an electronic control unit including a discharging circuit with a plurality of resistors connected in series, the discharging circuit being used for discharging electric charge stored in a smoothing capacitor.

2. Description of the Related Art

Conventionally, a discharging circuit configured by a plurality of resistors for discharging electric charge of a smoothing capacitor has been employed in various apparatuses. For example, Japanese Patent Application Laid-Open Publication No. 2008-172862 discloses a control apparatus including a discharging circuit used for a multiphase electric rotary machine.

This control apparatus is used for controlling a three-phase motor generator mounted on a hybrid vehicle. The control apparatus includes a capacitor, a discharge resistor, a voltage detecting circuit and a microprocessor. The capacitor is used for smoothing DC (direct current) voltage of the high voltage battery. The discharge resistor discharges the electric charge stored in the capacitor after the high voltage battery is blocked. The discharge resistor is configured by two series-connected resistor elements, and connected in parallel to the capacitor. The voltage detecting circuit detects the voltage of the lower voltage-potential-side resistor in the resistor elements and outputs the voltage to the microprocessor. The microprocessor compares the output voltage of the voltage detecting circuit with a threshold voltage and determines whether or not the discharge resistor is in an abnormal condition. Specifically, the microprocessor determines the resistor element of the discharge resistor is in abnormal condition when the output voltage of the voltage detecting circuit is a first threshold value or less, or a second threshold value or more.

In the hybrid vehicle, voltage of the high voltage battery largely varies depending on the state of the vehicle. In this regard, even if the resistor elements of the discharge resistor are in normal condition, the voltage of the lower voltage-potential-side resistor detected by the voltage detecting circuit varies. As described above, in the control apparatus, it is judged whether or not the resistor elements is in abnormal condition by comparing the output voltage of the voltage detecting circuit with the threshold voltage. Therefore, there is a concern that the judgment whether or not the resistor elements is in abnormal condition cannot be made properly.

SUMMARY

An embodiment provides an electronic control apparatus in which a judgment whether or not the resistor circuit corresponding to the discharge resistor elements are in abnormal condition can be made properly regardless of the voltage variation at the DC power source of the high voltage battery.

The inventor has been studying the problem in detail to understand the electronic control apparatus where a judgment can be made properly regardless of the voltage variation at the DC power source of the high voltage battery.

As a first aspect of the embodiment, the electronic control unit mounted on a vehicle includes: a capacitor that smoothes voltage of a DC power source electrically isolated from a body of the vehicle, a resistor circuit including a plurality of resistors connected in series, which is connected in parallel to the capacitor to discharge electric charge stored in the capacitor, and a fault judging circuit that judges whether or not the resistor circuit is in a fault condition by comparing the voltage across the resistor included in the resistor circuit with a fault threshold value. The fault judging circuit is adapted to change the fault threshold value based on the voltage of the DC power source. According to this configuration, even when the DC power source varies, the fault threshold value can be changed to an appropriate value. Hence, the fault judging circuit can determine whether or not the resistor circuit is in a fault condition properly even when the DC power source varies.

As a second aspect of the embodiment, the resistor circuit includes at least three resistors, and the fault judging circuit includes an operational amplifier, i.e., op-amp, a non-inverting input side resistor connected between a first series-connected point at a resistor included in the resistor circuit and a non-inverting input terminal of the op-amp, and an inverting-input side resistor connected between a second series-connected point of which potential is lower than the first series-connected point and an inverting input terminal of the op-amp whereby a differential amplifier circuit that amplifies voltage across the resistor in the resistor circuit is configured. Among the resistors included in the resistor circuit, a resistance value of the resistor disposed at the higher potential side of the first series-connected point and a resistance value of the resistor disposed at the lower potential side of the second series-connected point are set to be identical, and a resistance value of the non-inverting input side resistor and a resistance value of the inverting-input side resistor are set to be identical. According to this configuration, the DC power source is isolated from the body of the vehicle (vehicle-body). Hence, a voltage difference appears between the vehicle-body and the DC power source, and therefore an offset voltage is produced in the output voltage of the op-amp because of the voltage difference. However, among the resistors in the resistor circuit, the resistance value of the resistor disposed at the higher potential side of the first series-connected point and the resistance value of the resistor disposed at the lower potential side of the second series-connected point are set to be identical, and the resistance value of the non-inverting input side resistor and the resistance value of the inverting-input side resistor are set to be identical. In other words, the input impedance at the non-inverting input of the op-amp and the input impedance at the inverting-input of the op-amp are set to be identical. Accordingly, the offset voltage produced in the output voltage of the op-amp caused by the voltage difference appears between the vehicle-body and the DC power source can be suppressed.

As a third aspect of the embodiment, the resistor circuit and the differential amplifier circuit are mounted on the same circuit board. According to the configuration, the length of circuit-wiring can be shortened, that is a length of the circuit-wiring from the resistor in the resistor circuit to the non-inverting input side resistor and the inverting-input input side resistor, or a length of the circuit-wiring from the non-inverting input side resistor and the inverting-input input side resistor to the non-inverting input terminal of the op-amp and the inverting-input terminal of the op-amp can be shortened.

Therefore, the impedance of these circuit-wirings can be reduced. As a result, the input impedances at the non-inverting input and the inverting-input of the op-amp can be reliably set to be identical.

As a fourth aspect of the embodiment, the electronic control unit includes an overvoltage detection circuit that detects whether or not the voltage of the DC power source is an overvoltage based on an output of the differential amplifier and stops operation in the electronic control unit when the overvoltage detection circuit detects the overvoltage of the DC power source. According to this configuration, the differential amplifier is employed in order to judge whether or not the resistor circuit is in fault condition. Moreover, it is judged whether or not the DC power source is in overvoltage condition by using the differential amplifier. As a result, the electronic control unit can be protected from the overvoltage.

As a fifth aspect of the embodiment, among the resistor circuit, a resistance value of the resistor disposed at higher potential side of the first series-connected point and a resistance value of the resistor disposed at lower potential side of the second series-connected point are set to be lower than a resistance value of the resistor disposed between the first series-connected point and the second series-connected point. According to the embodiment, even if the resistor disposed between the first series-connected point and the second series-connected point has broken, the voltage of value close to the DC power source can be outputted. Therefore, miss-detecting of the overvoltage due to broken resistor can be avoided.

As a sixth aspect of the embodiment, the overvoltage detection circuit is configured by a hardware circuit. According to this configuration, the overvoltage can be recognized faster than detection by software. As a result, the electronic control unit can be reliably protected from the overvoltage.

As a seventh aspect of the embodiment, the electronic control unit includes a monitoring device for monitoring a voltage of the DC power source, and the fault judging circuit is configured to change the fault threshold value based on the voltage of the DC power source detected by the monitoring device. According to this configuration, the voltage at the DC power source can be monitored by the monitoring device. Therefore, a voltage detecting circuit is not necessary for detecting the voltage at the DC power source whereby the configuration of the electronic control unit can be simplified.

As a eighth aspect of the embodiment, the electronic control unit includes an alert circuit configured by a hardware circuit, in which the alert circuit judges whether or not the resistor circuit is in fault condition based on the output of the differential amplifier and outputs an alert towards outside the electronic control unit when the alert unit judges the resistor circuit is in fault condition. According to this configuration, comparing to a processing executed by software, the alert circuit can output the alert indicating a fault in the resistor circuit faster than that from software-processing. As a result, an electrical shock caused by electric charge stored in the smoothing capacitor can be reliably avoided.

As a ninth aspect of the embodiment, the electronic control unit is configured to control a motor used for driving the vehicle. According to this configuration, in the electronic control unit that controls the vehicle-motor, whether or not a fault occurs in the resistor circuit can be determined properly even when the voltage at the DC voltage source varies.

DETAILED DESCRIPTION OF THE PREFERRED EMBODIMENTS

Hereinafter the present invention will be described in detail with the following embodiments. In the following embodiments, as an example of an electronic control unit of the present invention, an electronic control unit is described, which is mounted on the vehicle and adapted for a motor control device controlling a motor for driving the vehicle (vehicle-drive motor).

Figure 1:
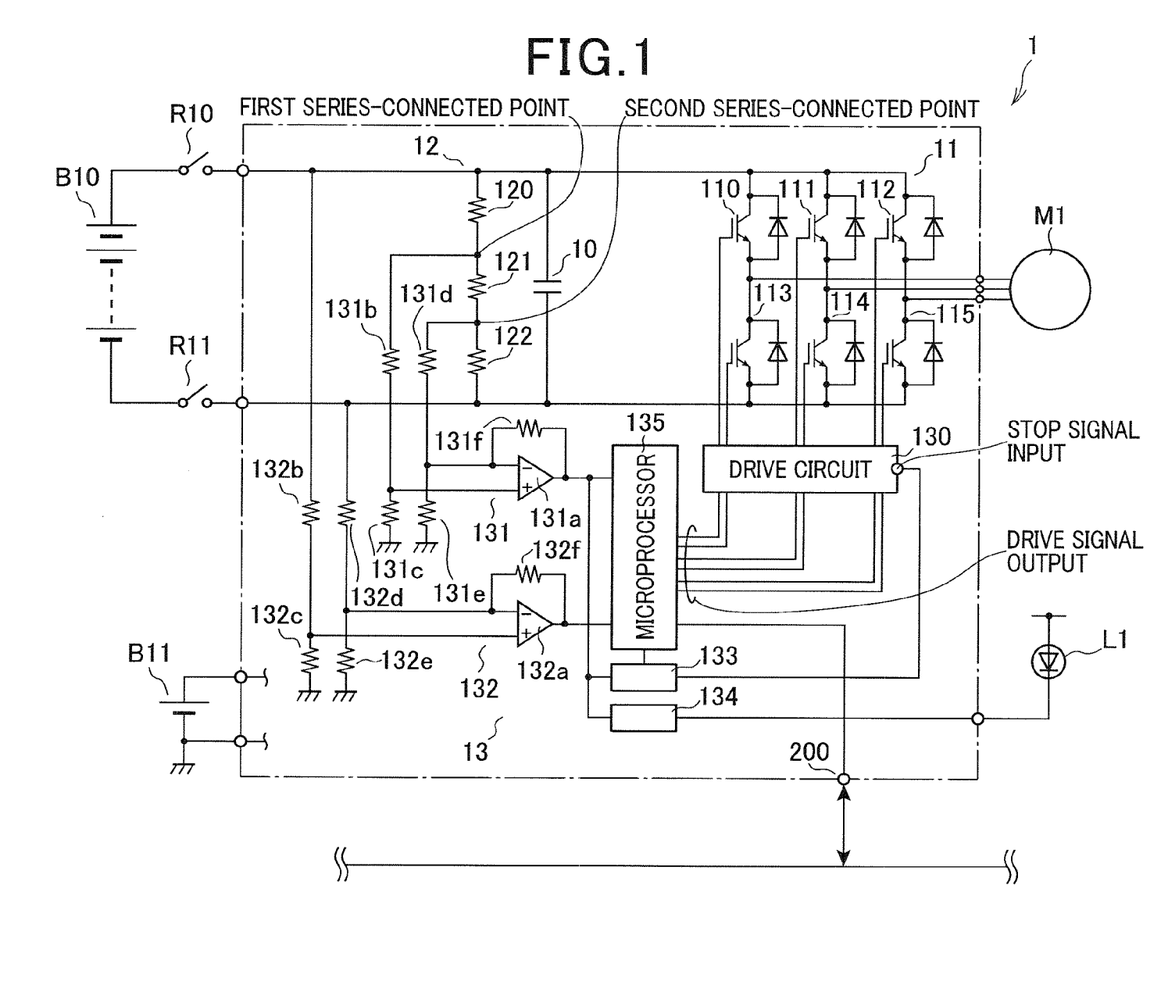
FIG. 1 is a circuit diagram of a motor control device according to an embodiment of the present invention.

With reference to FIG. 1, configuration of the motor control device according to the embodiment is now described as follows. FIG. 1 is a circuit diagram for the motor control device according to the embodiment.

As shown in FIG. 1, a motor control device 1 is configured to control a vehicle-drive motor M1 such that DC (direct current) high voltage e.g. 288V outputted from a high voltage battery B10 (DC power source) which is isolated from the vehicle-body is converted to three-phase AC (alternating current) voltage to supply the vehicle-drive motor M1 therewith. The motor control device 1 (electronic device) includes a smoothing capacitor 10, an inverter circuit 11, a resistor circuit 12 and a control circuit 13.

The smoothing capacitor 10 serves as an element for smoothing the high voltage supplied by the high voltage battery B10. The one end of the smoothing capacitor 10 is connected to the positive terminal of the high voltage battery 10 via a relay circuit R10. The other end of the smoothing capacitor 10 is connected to the negative terminal of the high voltage battery B10.

The inverter circuit 11 serves as a circuit to supply three-phase AC voltage converted from the DC high voltage which is smoothed by the smoothing capacitor 10 to the vehicle-drive motor M1. The inverter circuit 11 includes IGBTs (insulated gate bipolar transistors) 110 to 115.

Each of the IGBTs 110 and 113, IGBTs 111 and 114, and the IGBTs 112 and 115 is connected in series. Specifically, the emitter terminals of the IGBTs 110 to 112 are connected to the collector terminals of the IGBTs 113 to 115 respectively. Each of the series-connected IGBTs 110 and 113, 111 and 114, and 112 and 115 is connected in parallel with each other. The collector terminals of the IGBTs 110 to 112 are connected to one end of the smoothing capacitor and the emitter terminals of the IGBTs 113 to 115 are connected to the other end of the smoothing capacitor 10. The gate terminals of the IGBTs 110 to 115 are connected to the control circuit 13. Moreover, series-connected points at the IGBTs 110 and 113, 111 and 114, and 112 and 115 are connected to the vehicle-drive motor M1.

The resistor circuit 12 discharges electric charge stored in the smoothing capacitor 10 in order to prevent electric shock caused by the electric charge in the smoothing capacitor after the operation of the motor control device 1 is stopped. The resistor circuit 12 usually discharges the electric charge stored in the smoothing capacitor 10 gradually. The resistor circuit 12 is configured by three resistors 120 to 122 (a plurality of resistors) which are connected in series. The resistor circuit 12 is connected in parallel to the smoothing capacitor 10. Specifically, in the series-connected resistors 120 to 122, one end of the resistor 120 is connected to one end of the smoothing capacitor 10 and one end of the resistor 122 is connected to the other end of the smoothing capacitor 10.

The control circuit 13 is configured to control the inverter circuit 11, i.e., IGBTs 110 to 115 in response to a command inputted externally and to detect fault on the resistor circuit 12 and outputs an alert towards outside the control circuit 13 when fault is detected. Moreover, the control circuit 13 is configured to detect overvoltage at the high voltage battery B10 and stops the operation of the motor control device 1, i.e., the operation of the inverter circuit 11 when the overvoltage is detected. The control circuit 13 includes a drive circuit 130, a resistor-voltage detecting circuit 131 (fault judging circuit, differential amplifier), a battery voltage detecting circuit 132 (fault judging circuit), an overvoltage detection circuit 133, an alert circuit 134 and a microprocessor 135 (fault judging circuit).

The resistor-voltage detecting circuit 131, the battery voltage detecting circuit 132, the overvoltage detection circuit 133, the alert circuit 134 and the microprocessor 135 operate with DC low voltage supplied by a low voltage battery B11. The positive terminal of the low voltage battery B11 is connected to the power supply terminals (not shown) of the resistor-voltage detecting circuit 131, the battery voltage detecting circuit 132, the overvoltage detection circuit 133, the alert circuit 134 and the microprocessor 135. The negative terminal of the battery B11 is connected to the vehicle-body as a ground.

The drive circuit 130 serves as a circuit to drive the IGBTs 110 to 115 in response to a drive signal outputted by the microprocessor 135. Also, the drive circuit 130 stops driving the IGBTs 110 to 115 in response to a stop signal transmitted by the overvoltage detection circuit 133. The output terminal of the drive circuit 130 is connected to respective gate terminals of the IGBTs 110 to 115. The input terminal used for the drive signal is connected to the microprocessor 135. The input terminal used for the stop signal is connected to the overvoltage detection circuit 133.

The resistor-voltage detecting circuit 131 is configured to detect voltage (voltage difference) across the resistor 121 among the resistors 120 to 122 which constitute the resistor circuit 12. The resistor-voltage detecting circuit 131 includes an operational amplifier (op-amp) 131*a* and resistors 131*b* to 131*f*.

The op-amp 131*a* is a device that amplifies the voltage difference between the inverting input terminal and the non-inverting input terminal.

The resistor 131*b* (a resistor connected to the non-inverting input terminal of the op-amp 131*a*) and 131*c* are used to divide the voltage at the series-connected point between the resistor 120 and 121 (i.e., first series-connected point). The resistor 131*b* and 131*c* are connected in series. One end of the resistor 131*b* is connected to the series-connected point of the resistors 120 and 121 and one end of the resistor 131*c* is connected to the vehicle-body as a ground. The series-connected point of the resistors 131*b* and 131*c* is connected to the non-inverting input terminal of the op-amp 131*a*. In other words, the resistor 131*b* is connected between the series-connected points of the resistor 120 and 121 of the resistor circuit 12, and the non-inverting input terminal of the op-amp 131*a*.

The resistors 131*d* (a resistor connected to the inverting input terminal of the op-amp 131*a*) and 131*e* divide the voltage at the series-connected point of the resistor 121 and 122 (i.e., second series-connected point). The resistors 131*d* and 131*e* are connected in series. One end of the resistor 131*d* is connected to the series-connected point of the resistor 121 and 122, and one end of the resistor 131*e* is connected to the vehicle-body as a ground. The series-connected point of the resistor 131*d* and 131*e* is connected to the inverting input terminal of the op-amp 131*a*. In other word, the resistor 131*d* is connected between the series-connected point of the resistor 121 and 122, and the inverting input terminal of the op-amp 131*a*, that is, the resistor 131*d* is connected to a point having potential lower than the series-connected point of the resistor 120 and 121 where the resistor 131*b* is connected.

The resistor 131*f* sets the amplifier gain of the op-amp 131*a*. The one end of the resistor 131*f* is connected to the inverting input terminal of the op-amp 131*a* and the other end of the resistor 131*f* is connected to the output terminal of the op-amp 131*a*. The output terminal of the op-amp 131*a* is connected to the overvoltage detection circuit 133, the alert circuit 134 and the microprocessor 135.

The battery voltage detecting circuit 132 detects voltage of the high voltage battery B10. The battery voltage detecting circuit 132 includes op-amp 132*a* and resistors 132*b* to 132*f*.

The op-amp 132*a* amplifies the voltage difference between the inverting input terminal and the non-inverting input terminal and output the amplified voltage.

The resistors 132*b* and 132*c* divides the voltage at the positive terminal of the high voltage battery B10. The resistors 132*b* and 132*c* are connected in series. One end of the resistor 132*b* is connected to the positive terminal of the high voltage battery B10 and one end of the resistor 132*c* is connected to the vehicle-body as a ground. The series-connected point of the resistors 132*b* and 132*c* are connected to the non-inverting input terminal of the op-amp 132*a*.

The resistors 132*d* and 132*e* divide voltage at the negative terminal of the high voltage battery B10. The resistor 132*d* and 132*e* are connected in series. One end of the resistor 132*d* is connected to the negative terminal of the high voltage battery B10 and one end of the resistor 132*e* is connected to the vehicle-body as a ground. The series-connected point of the resistors 132*d* and 132*e* is connected to the inverting input terminal of the op-amp 132*a*.

The resistor 132*f* serves as a device to set the amplifier gain of the op-amp 132A. The one end of the resistor 132*f* is connected to the inverting input of the op-amp 132*a* and the other end of the resistor 132*f* is connected to the output terminal of the op-amp 132*a* which is connected to the microprocessor 135.

The overvoltage detection circuit 133 is configured to judge whether or not the voltage of the high voltage battery B10 shows overvoltage, based on the voltage across the resistor 121 detected by the resistor voltage detecting circuit 131, and forcibly stop operation of the inverter circuit 11 when the over voltage of the high voltage battery is detected. The voltage across the resistor 121 detected by the resistor voltage detecting circuit 131 is a voltage divided from the voltage at the high voltage battery B10, the voltage across the resistor 121 being divided by the resistor circuit 12. The overvoltage detection circuit 133 compares the voltage across the resistor 121 detected by the resistor voltage detecting circuit 131 with a predetermined overvoltage threshold value. The overvoltage detection circuit 133 detects overvoltage of the high voltage battery B10 when the detected voltage across the resistor 121 is the over voltage threshold or more. Then, when overvoltage detection circuit 133 detects the overvoltage of the high voltage battery B10, the overvoltage detection circuit 133 outputs a stop signal so as to forcibly stop operation of the inverter circuit 110 via the drive circuit 130.

The overvoltage detection circuit 133 is configured by a hardware circuit. Also, the overvoltage threshold value is configured by the hardware circuit as well. The voltage input terminal of the overvoltage detection circuit 133 is connected to the output terminal of the op-amp 131*a* which constitutes the resistor voltage detecting circuit 131. The stop signal output terminal is connected to the stop signal input terminal of the drive circuit 130.

The alert circuit 134 judges whether or not the resistor circuit 12 is in an abnormal condition (fault condition) based on the voltage across the resistor 121 detected by the resistor voltage detecting circuit 131 and alerts outside when the resistor circuit 12 is in fault condition. The alert circuit 134 compares the voltage across the resistor 121 detected by the resistor voltage detecting circuit 131 with predetermined first and second fault threshold values. The alert circuit 134 determines that at least one of resistor 120 or 122 has a breakage of wire or the resistor 121 has a short circuit when the detected voltage across the resistor 121 is lower than or equal to the first fault threshold. Meanwhile, when the detected voltage across the resistor 121 is higher than or equal to the second fault threshold value which is higher than the first fault threshold voltage, the alert circuit determines that the at least one of resistor 120 or 122 has a short circuit or the resistor 121 has a breakage of wire. When detecting a fault of the resistor circuit 12, the alert unit outputs an alert signal towards outside and turn on a light-emitting diode (LED) L1.

The first fault threshold value is set to be a voltage value lower than the voltage across the resistor 121 detected when the high voltage battery B10 is a reference voltage e.g. 288 volts by the resistor voltage detecting circuit 131. The second fault threshold value is set to be a voltage higher than the voltage across the resistor 121 detected when the high voltage battery B10 is at the reference voltage by the resistor voltage detecting circuit 131.

The alert circuit 134 is configured by the hardware circuit. The first and second fault threshold is set by the hardware circuit. The voltage input terminal of the alert circuit 134 is connected to the output terminal of the op-amp 131a which constitutes the resistor voltage detecting circuit 131.

The output terminal of the alert signal is connected to the light-emitting diode L1 disposed outside the motor control device 1.

The microprocessor 135 serves as a device to generate the drive signal based on the command received from outside and to control the IGBTs 110 to 115 via the drive circuit 130. Moreover, to discharge the electric charge stored in the smoothing capacitor 10 after the ignition switch (not shown) is turned off, the microprocessor 135 is configured to generate a drive signal to supply the vehicle-drive motor M1 with a reactive power which generates no torque and to control the IGBTs 110 to 115 via the drive circuit 130. Furthermore, the microprocessor serves as a device to determine whether or not the resistor 12 is in a fault condition based on the voltage across the resistor 121 detected by the resistor voltage detecting circuit 131 and to issue an external alert when the resistor circuit 12 is in a fault condition.

Figure 3A:
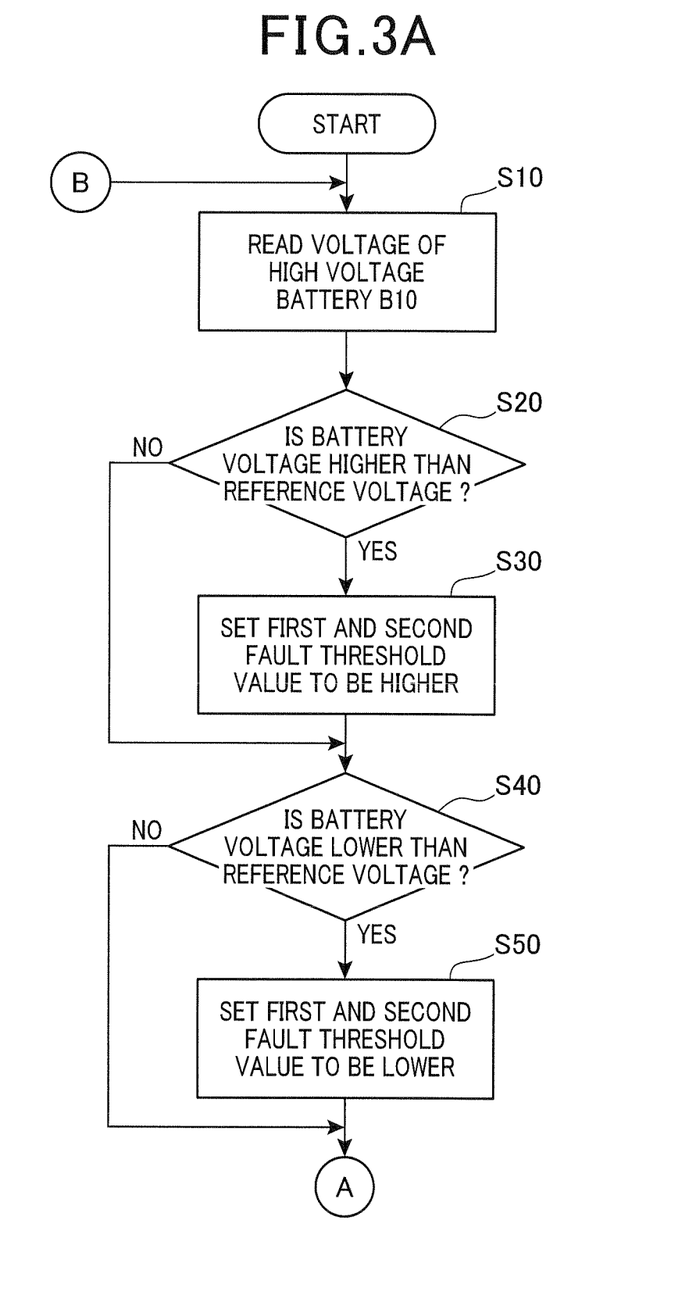
FIGS. 3A and 3B are a flow chart showing a fault judging procedure executed at a microprocessor.
Figure 3B:
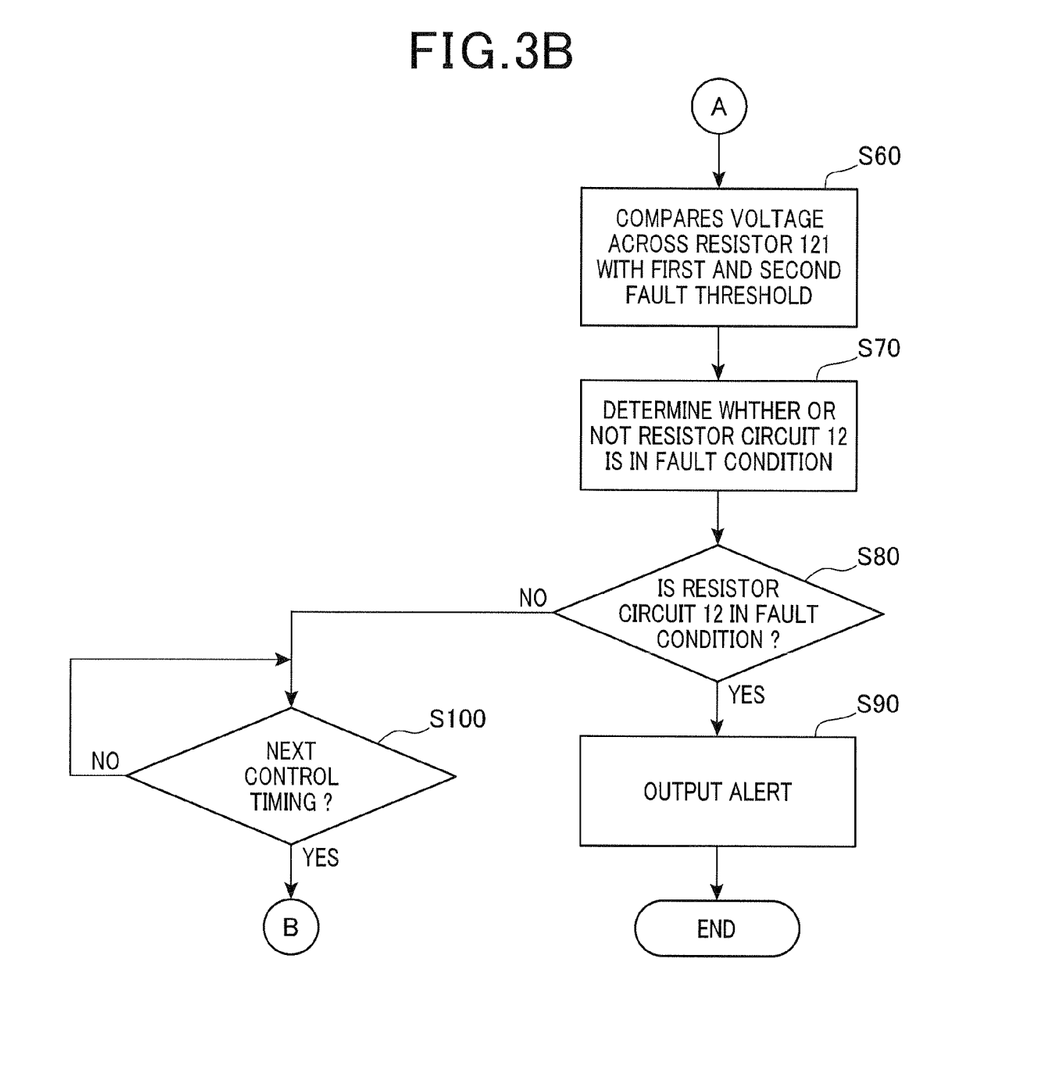

With reference to FIGS. 3A and 3B, a fault judging procedure is now described as follows. This procedure is executed periodically by the microprocessor 135 after the ignition key is turned ON.

In the procedure, the microprocessor 135 reads the voltage of the high voltage battery B10 detected by the battery voltage detecting circuit 132 (S10). The microprocessor 135 changes the first and second fault threshold values which are set in advance (as default values) based on the voltage of the high voltage battery B10. Specifically, the microprocessor 135 changes the first and second fault threshold values to be higher value depending on the voltage of the high voltage battery B10, when the voltage of the high voltage battery B10 is higher than the reference voltage (S20, S30). When the voltage of the high voltage battery B10 is lower than the reference voltage, the first and second fault threshold are changed to be lower depending on the voltage of the battery (S40, S50). Then, the microprocessor 135 compares the voltage across the resistor 121 detected by the resistor voltage detecting circuit 131 with the changed first and second fault threshold (S60). At step S70, when the voltage across the resistor 121 is lower than or equal to the changed first fault threshold, the microprocessor 135 determines that at least one of resistor 120 or 122 has a breakage of wire or the resistor 121 has a short circuit (i.e., fault condition). Meanwhile, at step 70, when the detected voltage across the resistor 121 is higher than or equal to the changed second fault threshold value, the microprocessor 135 determines that at least one of resistor 120 or 122 has a short circuit or the resistor 121 has a breakage of wire (i.e., fault condition). The microprocessor 135 outputs an alert towards outside via bi-directional communication terminal 200 when detecting the fault condition at the resistor 12 (S80, S90). The procedure repeats executing the procedure at the next control timing if no fault condition is detected (S100).

The first and second fault threshold values are identical with the one from the alert circuit 134 and the values are being set in the microprocessor 135.

The analog input terminal of the microprocessor 135 is connected to the output terminal of the op-amp 131a which constitutes the resistor voltage detecting circuit 131. The other analog input terminal is connected to the output terminal of the op-amp 132a which constitutes the battery voltage detecting circuit 132. The drive signal output terminal of the microprocessor 135 is connected to the drive signal input terminal of the drive circuit. Moreover, the alert signal output terminal (not shown) is connected to the light-emitting diode (not shown) disposed outside the motor control device 1.

It is noted that the resistor circuit 12, the drive circuit 130, the resistor voltage detecting circuit 131, the battery voltage detecting circuit 132, the overvoltage detection circuit 133, the alert circuit 134 and the microprocessor 135 are mounted on the same circuit board.

In the resistor circuit 12 configured by the resistors 120 to 122, the resistance value of the resistor 120 disposed at higher potential side of the connection point where the resistor 131b is connected, is designed to be the same as the resistance value of the resistor 122 disposed at lower potential side of the connection point where the resistor 131d is connected. Further, in the resistor voltage detecting circuit 131 configured by the resistor 131b and 131d, the resistance value of the resistor 131b is designed to be the same as the resistance value of the resistor 131d. In the resistor voltage detecting circuit 131, the resistance value of the resistor 131c and the resistance value of the parallel-connected resistors 131e and 131f are designed to be the same resistance value. Furthermore, the resistance values of the resistors 120 and 122 which constitute the resistor circuit 120 is designed to be much lower than the resistance value of the resistor 121 connected between the connection point where the resistor 131b is connected and the connection point where the resistor 131d is connected.

Next, with reference to FIG. 1, operation of the motor control device 1 is now described as follows. When the ignition switch of the vehicle turns ON, relay circuits R10 and R11 as shown in FIG. 1 turn ON, then the motor control device 1 starts to operate. When the relay circuit R10 and R11 turn ON, the DC high voltage of the high voltage battery B10 is smoothed by the smoothing capacitor 10. The control circuit 13 generates the drive signals based on the command received from outside the motor control device 1 and drives the IGBTs 110 to 115 of the inverter circuit 11 via the drive circuit 130. The inverter circuit 11 converts the DC high voltage smoothed by the smoothing capacitor 10 into the three-phase AC voltage and supplies the vehicle-drive motor M1 with the three-phase AC voltage. Thus, the motor control device 1 controls the vehicle-drive motor M1.

Subsequently, when the ignition switch turns OFF, the relay circuit R10 and R11 turns OFF and the electric charge stored in the smoothing capacitor remains unchanged. The microprocessor 135 generates a drive signal to supply the vehicle-drive motor M1 with a reactive power which generates no torque and controls the IGBTs 110 to 115 of the inverter circuit 11 via the drive circuit 130. The inverter circuit 11 supplies the reactive power generating no torque by using the electric charge stored in the smoothing capacitor 10 to the vehicle-drive motor M1. As a result, the electric charge stored in the smoothing capacitor 10 is discharged.

When the operation of the motor control device 1 is stopped, electric charge remaining in the smoothing capacitor 10 even when the reactive power is supplied, or electric charge remaining in the smoothing capacitor without discharging because the reactive power is not supplied due to malfunction of the microcomputer 135, is discharged via the resistor circuit 12.

In the following, operation of the overvoltage detection for the high voltage battery B10 is described. The voltage across the resistor 121 detected by the resistor voltage detecting circuit 131 is a voltage divided by the resistor circuit 12.

The overvoltage detection circuit 133 compares the voltage across the resistor 121 detected by the resistor voltage detecting circuit 131 with a predetermined overvoltage threshold. When the detected voltage across the resistor 121 is the predetermined threshold or more, the overvoltage detection circuit 133 detects that the voltage of the high voltage battery B10 is in the overvoltage state. Then, when the voltage of the high voltage battery B10 is judged as an overvoltage, the overvoltage detection circuit 133 outputs the stop signal to forcibly stop the inverter circuit 11.

Next, a fault detecting operation for the resistor circuit is described. The alert circuit 134 compares the voltage across the resistor 121 detected by the resistor voltage detecting circuit 131 with the predetermined first and second fault threshold values. When the voltage across the resistor 121 is the first fault threshold value or less, or the voltage across the resistor 121 is the second fault threshold value or more, the alert circuit 134 determines that the resistor circuit 12 is in fault condition. When the resistor circuit 12 is in fault condition, the alert circuit outputs the alert signal towards outside to turn ON the LED L1.

The microprocessor 135 changes the values of the predetermined first and second fault threshold based on the voltage of the high voltage battery B10 detected by the battery voltage detecting circuit 132. In more detail, when the voltage of the high voltage battery B10 is higher than the reference voltage, depending on the amount by which the voltage exceeds the reference value, the microprocessor 135 changes the first and second fault threshold values to be higher. Meanwhile, when the voltage of the high voltage battery B10 is lower than the reference voltage, depending on the amount of voltage, the microprocessor 135 changes the first and second fault threshold values to be lower. Then, the microprocessor 135 compares the voltage across the resistor 121 detected by the resistor voltage detecting circuit 131 with the changed first and second fault threshold values. When the detected voltage across the resistor 121 is the changed first fault threshold value or less, the microprocessor 135 determines that at least one of resistor 120 or 122 has a breakage of wire or the resistor 121 has a short circuit. When the detected voltage across the resistor 121 is the changed second fault threshold value or more, the microprocessor 135 determines that the at least one of resistor 120 or 122 has a short circuit or the resistor 121 has a breakage of wire. When the resistor circuit 12 is in fault condition, the alert circuit 134 externally outputs the alert signal.

Next, advantages of the present invention are now described as follows. According to the embodiment, even when the voltage of the high voltage battery B10 varies, the first and second fault threshold values can be changed to appropriate values. Therefore, in the motor control device that controls the vehicle-drive motor, it is appropriately determined whether or not the resistor circuit 12 is in a fault condition even when the voltage of the high voltage battery B10 varies.

According to the embodiment, the high voltage battery B10 is electrically isolated from the vehicle body. Therefore, a voltage difference appears between the vehicle-body and the high voltage battery. Due to the voltage difference, an offset voltage appears at the output voltage of the op-amp 131a. However, respective resistance values of the resistor 120 and 122 are designed to be identical and the resistance values of the resistors 131b and 131d are designed to be identical as well. In other words, the input impedance at the non-inverting input of the op-amp 131a and the input impedance of the inverting-input of the op-amp 131a are designed to be the same. The offset voltage caused by the voltage difference between the vehicle-body and the high voltage battery at the output of the op-amp 131a can be suppressed. Moreover, the resistance value of the resistor 131c and the resistance value of the parallel-connected resistors 131e and 131f are designed to be the same. Hence, even when the voltage difference between the vehicle-body and the high voltage battery B10 increases, output variation of the op-amp 131a caused by increasing of the voltage difference can be suppressed as well.

According to the embodiment, the resistor circuit 12 and the resistor voltage detecting circuit 131 are disposed at the same circuit board. Therefore, length of wiring between the resistor circuit 12 and the resistors 131b and 131b, or length of wiring from the resistors 131b and 131d to the non-inverting input terminal and the inverting input terminal of the op-amp 131a can be shortened as much as possible. Accordingly, these wiring impedance can be suppressed. As a result, the input impedance of the non-inverting input terminal of the op-amp 131a and the inverting input terminal of the op-amp 131a can reliably be the same value.

According to the embodiment, the overvoltage detection circuit 133 is able to detect whether or not the voltage of the high voltage battery B10 is overvoltage by using the resistor voltage detecting circuit 131. Therefore, the motor control device 1 can be protected from the overvoltage.

According to the embodiment, resistance values of the resistors 120, 122 are designed to be much lower than the resistance value of the resistor 121. Hence, even when the resistor 121 has a broken wire, the resistor voltage detecting circuit 131 can output voltage of which value is close to the voltage of the high voltage battery B10. As a result, accidentally detecting overvoltage due to broken wire of the resistor 121 can be avoided.

According to the embodiment, the overvoltage detection circuit 133 is configured by a hardware circuit. Therefore, the overvoltage can be immediately detected when comparing with software processing. As a result, the motor control device 1 suffering from the overvoltage can be reliably avoided.

According to the embodiment, the alert circuit 134 is configured by a hardware circuit. Hence, abnormal event such as a fault can be immediately notified externally. Accordingly, electric shock caused by the electric charge stored in the smoothing capacitor 10 can be reliably avoided.

Figure 2:
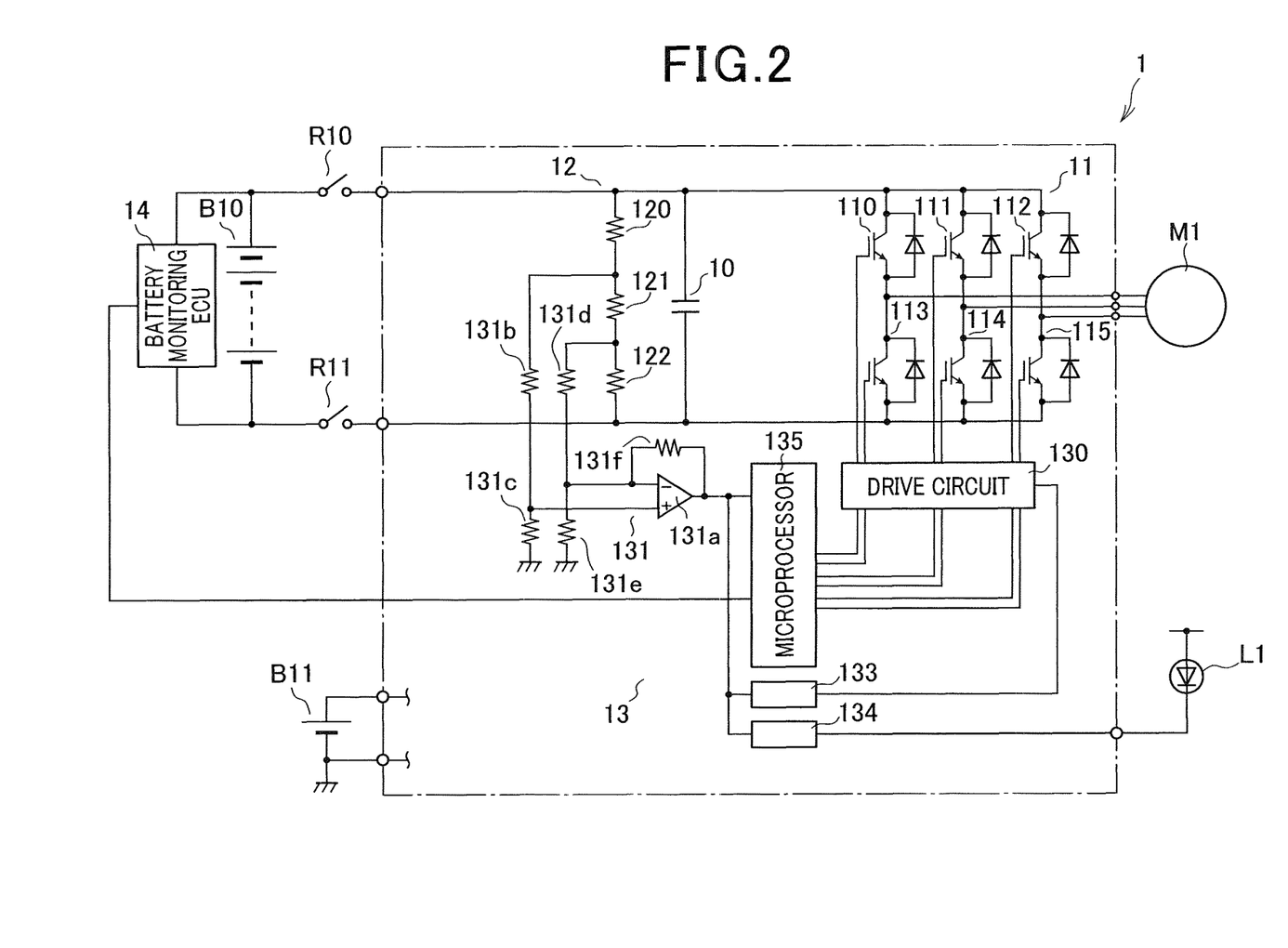
FIG. 2 is a circuit diagram of a motor control device according to other embodiment.

According to the embodiment, the motor control device 1 includes the battery voltage detecting circuit 132 and changes the first and second fault threshold based on the voltage of the high voltage battery B10 detected by the battery voltage detecting circuit 132. However, the configuration is not limited to this configuration. As shown in FIG. 2, the hybrid vehicle includes a battery monitoring ECU (Electronic Control Unit) 14, i.e., DC power source monitoring device (monitoring device) for monitoring the voltage of the high voltage battery B10. Therefore, the first and second fault threshold may be changed based on the voltage of the high voltage battery B10 detected by the battery monitoring ECU 14. Since the battery voltage detecting circuit to detect the voltage of the high voltage battery B10 is not necessarily arranged separately, the configuration of the motor control unit 1 can be simplified.

According to the embodiment, it is exemplified that the resistor circuit 12 includes three resistors 120 to 122 and the resistor voltage detecting circuit 131 detects the voltage of a resistor 121 included in the resistor circuit 12. However, the configuration is not limited to this circuit configuration. For example, the resistor circuit can be series-connected two resistors or can be series-connected four resistors. Moreover, the resistor voltage detecting circuit may detect voltage of two or more resistors connected in series.

What is claimed is:

1. An electronic control unit mounted on a vehicle comprising:
   a capacitor that smoothes voltage of a DC power source electrically isolated from a body of the vehicle;
   a resistor circuit including a plurality of resistors connected in series, which is connected in parallel to the capacitor to discharge electric charge stored in the capacitor; and
   a fault judging circuit that judges whether or not the resistor circuit is in a fault condition by comparing the voltage across a resistor included in the resistor circuit with a fault threshold value, wherein the fault judging circuit changes the fault threshold value based on the voltage of the DC power source; wherein:
   the resistor circuit includes at least three resistors,
   the fault judging circuit includes an operational amplifier, a non-inverting input side resistor connected between a first series-connected point at a resistor included in the resistor circuit and a non-inverting input terminal of the operational amplifier, and an inverting-input side resistor connected between a second series-connected point of which potential is lower than the first series-connected point and an inverting input terminal of the operational amplifier so as to constitute a differential amplifier circuit that amplifies voltage across the resistor in the resistor circuit, and
   among the resistors included in the resistor circuit, a resistance value of the resistor disposed at the higher potential side of the first series-connected point and a resistance value of the resistor disposed at the lower potential side of the second series-connected point are set to be identical, and a resistance value of the non-inverting input side resistor and a resistance value of the inverting-input side resistor are set to be identical.

2. The electronic control unit according to claim 1, wherein the resistor circuit and the differential amplifier circuit are mounted on the same circuit board.

3. The electronic control unit according to claim 1, further comprising an overvoltage detection circuit that detects whether or not voltage of the DC power source is overvoltage based on an output of the differential amplifier and stops operation in the electronic control unit when the overvoltage detection circuit detects the overvoltage of the DC power source.

4. The electronic control unit according to claim 3, wherein among the resistor circuit, a resistance value of the resistor disposed at higher potential side than the first series-connected point and a resistance value of the resistor disposed at lower potential side than the second series-connected point are set to be lower than a resistance value of the resistor disposed between the first series-connected point and the second series-connected point.

5. The electronic control unit according to claim 3, wherein the overvoltage detection circuit is configured by a hardware circuit.

6. The electronic control unit according to claim 1, further comprising a monitoring device for monitoring a voltage of the DC power source, and the fault judging circuit is configured to change the fault threshold value based on the voltage of the DC power source detected by the monitoring device.

7. The electronic control unit according to claim 1, further comprising an alert circuit configured by a hardware circuit, wherein the alert circuit judges whether or not the resistor circuit is in a fault condition based on an output of the differential amplifier and outputs an alert towards outside the electronic control unit when the alert unit judges that the resistor circuit is in a fault condition.

8. The electronic control unit according to claim 1, wherein the electronic control unit is configured to control a motor used for driving the vehicle.

* * * * *